United States Patent [19]
Knauff et al.

[11] Patent Number: 5,736,925
[45] Date of Patent: Apr. 7, 1998

[54] VEHICLE WARNING SYSTEM CONTROLLER

[75] Inventors: Robert J. Knauff, Hilliard; Terry Dawson, Westerville, both of Ohio

[73] Assignee: Weldon Technologies, Inc., Hilliard, Ohio

[21] Appl. No.: 666,120

[22] Filed: Jun. 21, 1996

[51] Int. Cl.$^6$ .................................................. B60Q 1/26
[52] U.S. Cl. .................... 340/468; 340/463; 340/472; 362/80
[58] Field of Search .......................... 340/468, 469, 340/471, 463, 464, 815.45, 815.65, 472, 473, 479; 362/61, 32, 80

[56] References Cited

U.S. PATENT DOCUMENTS

| | | | |
|---|---|---|---|
| 4,004,274 | 1/1977 | Menke et al. | 340/84 |
| 4,240,062 | 12/1980 | Gosswiller | 340/81 R |
| 4,357,595 | 11/1982 | Gosswiller | 340/81 R |
| 4,368,349 | 1/1983 | Donley et al. | 174/52 PE |
| 4,595,904 | 6/1986 | Gosswiller et al. | 340/87 |
| 4,635,039 | 1/1987 | Gosswiller | 340/384 R |
| 4,701,743 | 10/1987 | Pearlman et al. | 340/84 |
| 4,831,357 | 5/1989 | Miller | 340/472 |
| 4,924,176 | 5/1990 | Tremblay | 324/133 |
| 4,954,753 | 9/1990 | Sikora | 315/219 |
| 4,958,143 | 9/1990 | Knauff | 340/479 |
| 5,003,288 | 3/1991 | Wilhelm | 340/468 X |
| 5,057,815 | 10/1991 | Smoot et al. | 340/468 |
| 5,057,985 | 10/1991 | Kreutzer, Jr. et al. | 362/425 |
| 5,097,397 | 3/1992 | Stanuch et al. | 362/74 |
| 5,355,119 | 10/1994 | Pearlman | 340/468 |
| 5,422,623 | 6/1995 | Bader et al. | 340/331 |
| 5,426,417 | 6/1995 | Stanuch | 340/473 |
| 5,452,188 | 9/1995 | Green et al. | 362/227 |

*Primary Examiner*—Jeffery Hofsass
*Assistant Examiner*—Anh La
*Attorney, Agent, or Firm*—James R. Eley, Esq.

[57] ABSTRACT

A vehicle warning system controller is disclosed which controls and synchronizes all annunciators installed on a vehicle. The vehicle light control system takes a modular approach to vehicle light control. The first module is an operator module that accepts control commands from an operator and provides visual feedback to the operator. The second module is a central module which processes the commands and controls the attached annunciators and accessories. The vehicle light control system of the present invention has the ability to interface with and control several types of annunciators.

13 Claims, 14 Drawing Sheets

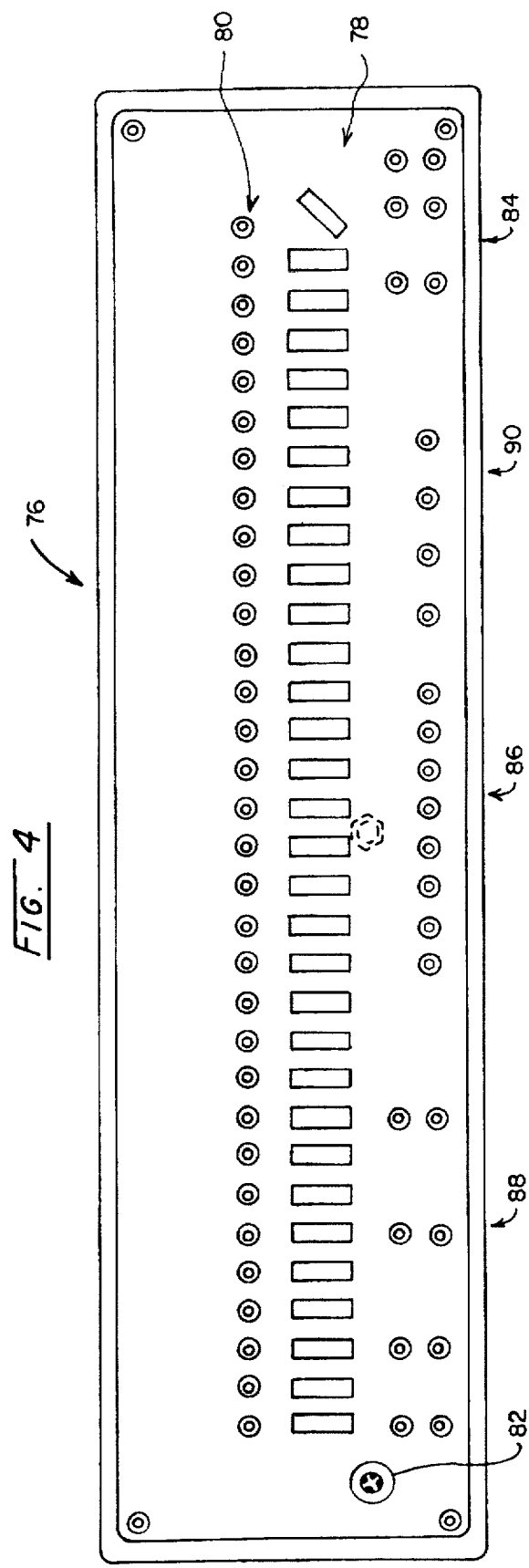

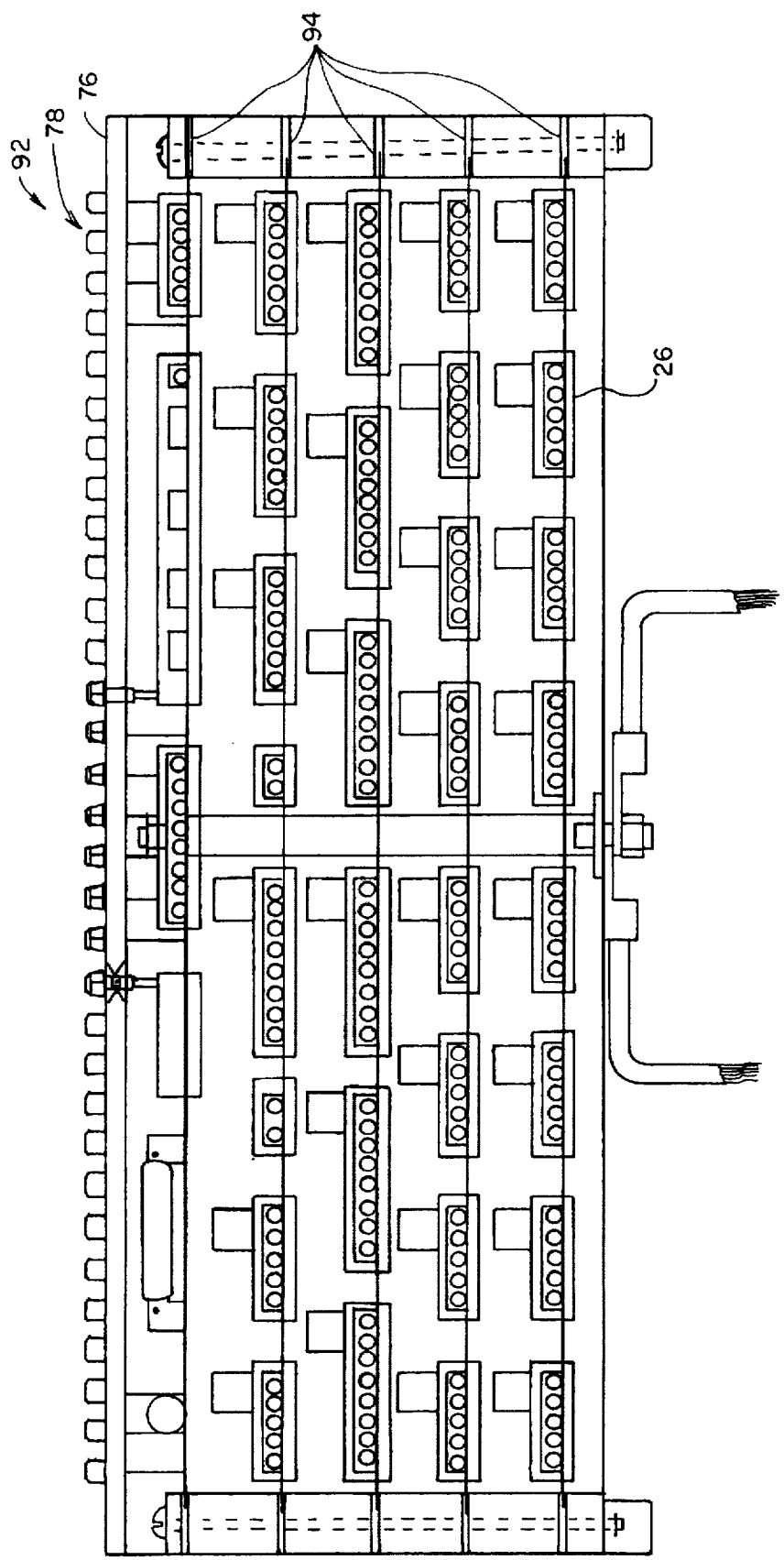

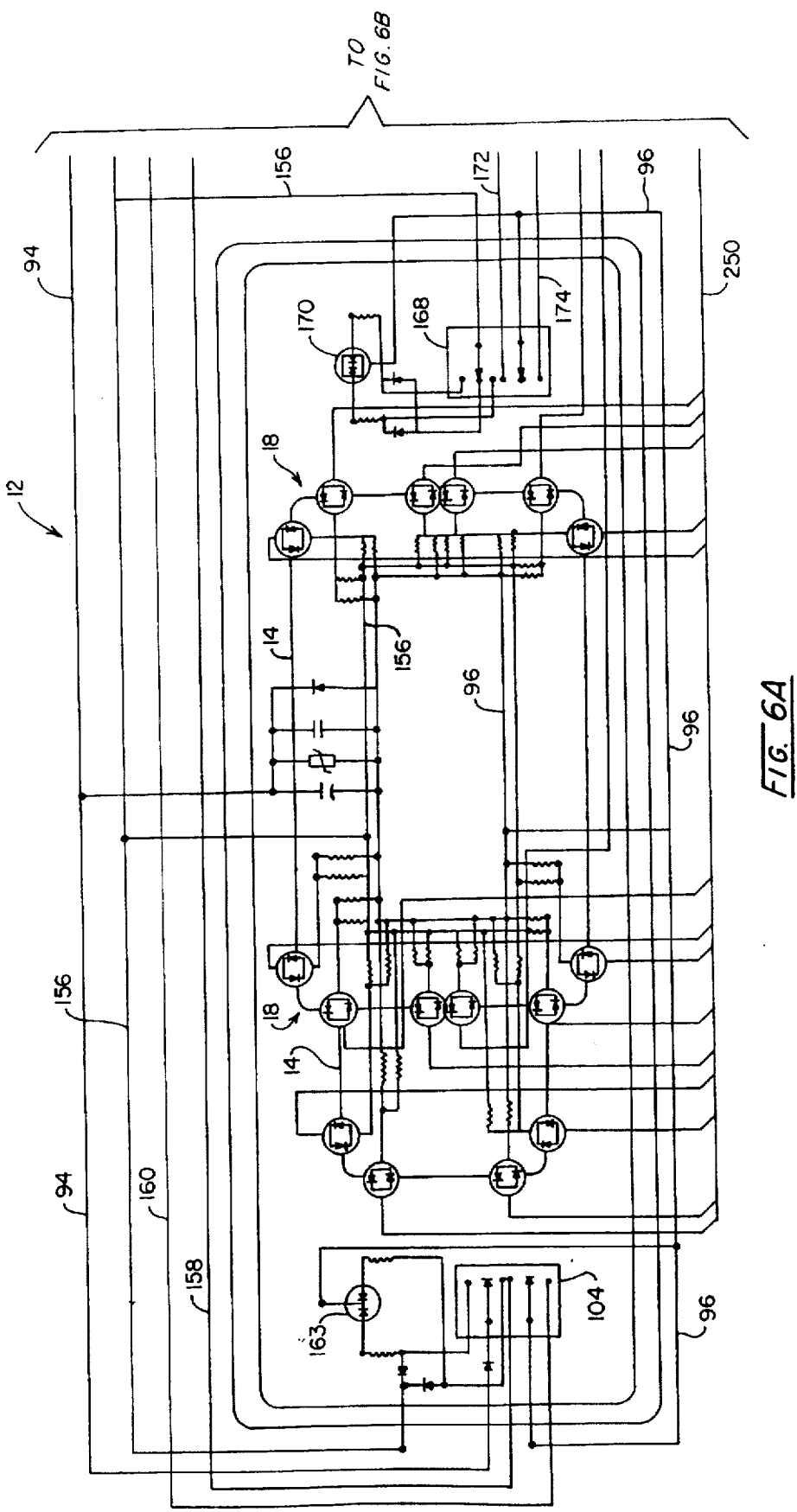

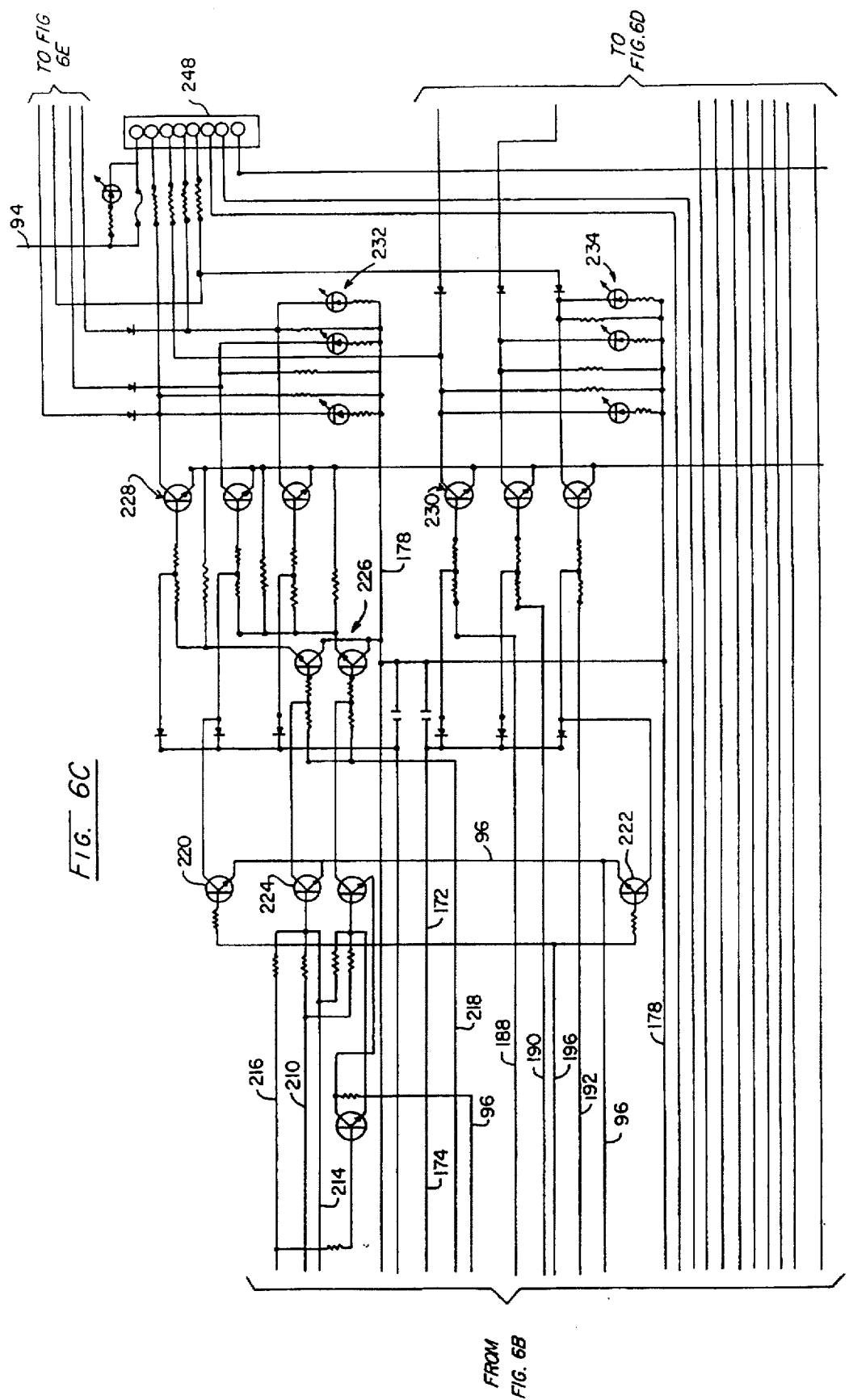

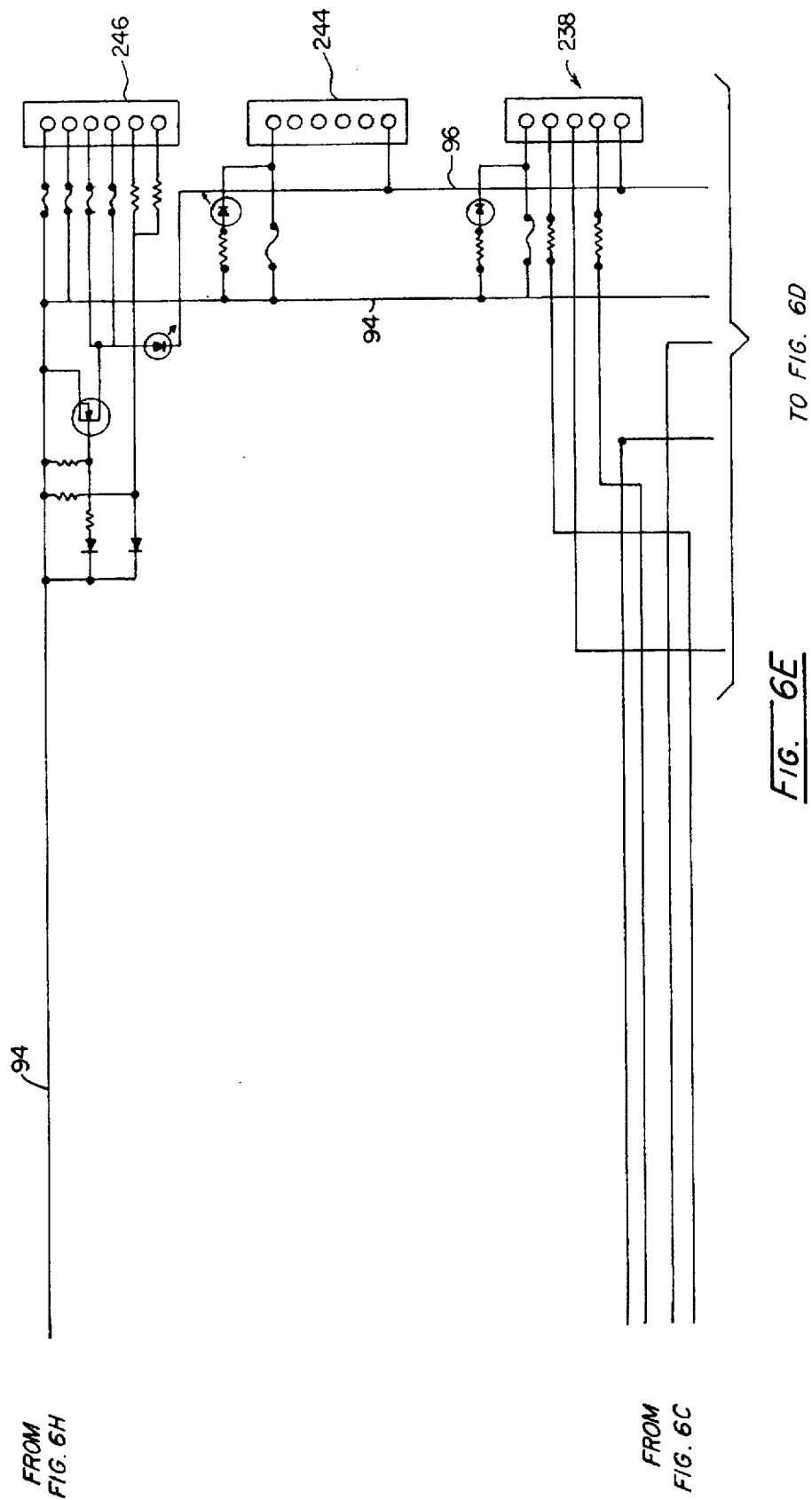

VEHICLE WARNING SYSTEM CONTROLLER

BACKGROUND

The present invention is directed generally to a vehicle warning system controller and more particularly to an emergency vehicle warning light control system. Light systems may be utilized on many different types of vehicles such as police cars, fire trucks, ambulances, tow trucks, utility trucks, maintenance trucks, as well as other vehicles such as aircraft which may benefit from a warning light system. Lighting systems may include lightheads mounted on the exterior of any vehicle such as light bars, as well as headlights and tail lights.

One function of an emergency vehicle is to traverse a distance in the shortest time and safest manner possible. To assist in achieving the goal of shortest time, emergency vehicles may be permitted to ignore the standard traffic controls which apply to other vehicles. Emergency vehicles commonly ignore traffic lights and speed limits. In addition to ignoring traffic controls while in motion, emergency vehicles are often required to stop and provide service in heavily trafficked areas. As a result, other drivers can be startled by the presence of such an emergency vehicle disrupting the normal traffic flow pattern. These situations can place both the startled driver and the emergency vehicle personnel, as well as others, in danger as they attempt to react to each other. To minimize the risk of surprise, emergency vehicles generally utilize a combination of sirens and lights to catch the attention of other drivers. Such systems are designed to permit others to perceive the emergency vehicle early enough to allow an appropriate reaction to the emergency vehicle, thus avoiding potentially dangerous situations. The more conspicuous the warning system on the vehicle, the more likely drivers of other vehicles will be able to respond in a timely manner to the emergency vehicle's presence.

Emergency vehicle warning systems generally utilize both halogen, or incandescent, lamps in combination with xenon-type strobe lamps, as well as audio annunciators to gain the attention of the drivers of other vehicles. An incandescent lamp may be on constantly or may be flashed to gain attention. Incandescent lamps have the advantage of being easily perceived and tracked by an observer. However, incandescent lamps have the disadvantage of having a low degree of conspicuity, that is, the ability of commanding an observer's attention peripherally or from a distance. Flashing incandescent lamps are commonly utilized because they are already present on the vehicle, being used as turn and brake signals, traffic control signals and other warning signals. As a result, an emergency vehicle's flashing incandescent lamps may blend into a background of other flashing lights and be indistinguishable to an observer.

By contrast, xenon-type strobes possess a high degree of conspicuity. Their high intensity light is very conspicuous against most backgrounds and is easily detected, even when outside a direct line of sight of the observer. However, because strobe pulses are visually difficult to locate and track, a pulsing strobe light may appear to be moving toward an observer when, in fact, it is stationary or moving away from the observer. Thus strobe lights, if used alone as an emergency warning system, can introduce an undesirable visual ambiguity in an emergency situation.

When incandescent and strobe lamps are used in combination, the benefits of each can compensate for the disadvantages of the other. The strobes may be pulsed to command attention, thus prompting an observer to seek out the source of the light. Alternately, the incandescent may be flashed between strobe pulses to indicate the light source to the observer. The alternating combination of the two sources of light results in a greater overall level of conspicuity, thus producing a more effective emergency vehicle warning system.

Heretofore, emergency vehicle warning light systems have utilized separate control systems for each of the incandescent and strobe lamp systems. The flashing of the incandescent lamps and the pulsing of the strobe lamps were not synchronized with each other. Therefore, while incandescent and strobe lamps have been utilized together on vehicles, their operation has not been synchronized to fully utilize the visual advantages of the combining the two lamp types.

In order to operate strobe lamps, constant voltages of hundreds of volts and triggering voltages of several thousand volts may be required. Such high voltage lines generate large amounts of radio-frequency interference (RFI) which can adversely affect a vehicle's electrical system. A high degree of shielding insulation and electronic filtering is generally required to minimize such RFI. There is a need for a system which effectively minimizes RFI and thus eliminate or otherwise minimize the need for such shielding and filtering.

Emergency vehicle warning light systems have been designed to command different levels of attention for varying conditions. For example, an ambulance speeding enroute to an emergency site will generally require a high level of attention. The same ambulance will require even higher levels of attention for particularly dangerous areas through which it may pass, such as through an intersection where crossing traffic may encounter the emergency vehicle quite suddenly. Once an emergency vehicle arrives at the scene a lower degree of conspicuity is generally desired as a stationary, or otherwise idle, emergency vehicle does not pose as great a danger as a moving one. Additionally, a high attention level of lighting and audio annunciators may be distracting to emergency personnel operating at the scene and third party observers. To avoid these problems a warning mode employing a lower level of conspicuity may be used which does not disturb and distract the personnel on the scene but still observers to locate and avoid the emergency situs. As an example, under low light environmental conditions, such as at night, emergency personnel operating around an ambulance can be adversely affected by the intensity of the vehicle's warning lights. Proximate exposure to high intensity strobe lights may cause disorientation and loss of low light vision adaptation.

In addition to the human factors, power requirements for emergency lighting systems are substantial, especially when operating all lights at full power. It is desirable that the warning systems on emergency vehicles be effectively operable at lower levels which would, in turn, lower the vehicle's load demand.

One example of a vehicle light system typically is found on an ambulance and is characterized as having three banks of lights attached at various locations on its exterior. A first bank of ten lightheads are positioned high at the corners and at the center front and rear of the vehicle, and are commonly referred to as the "A" lights. A second bank consists of one, centered, rearward-facing lighthead, and is referred to as the "B" light. A third bank of five lightheads are mounted low on the forward end of the vehicle with two facing forward on the grill, two facing sideways and one mounted high in the center front of the vehicle. This bank is commonly referred to as the "C" lights.

Heretofore, ambulance warning light systems have only three modes of operation: "primary"; "secondary"; and "off". The primary mode of operation generally consists of a flashing pattern of "A" lights alternating with the "B" and "C" lights. The primary mode is used when a high degree of attention must be commanded, such as when trying to clear traffic. The secondary mode generally consists of a flashing pattern of "A" lights alternating with the "B" light. The secondary mode is used when a lower degree of conspicuity is desired such as when the emergency vehicle is at the emergency situs. A vehicle light control system that provides wider variety of control over the operation of the vehicle lightheads and other annunciating components is needed.

Under some environmental conditions, flashing incandescent lamps and pulsing strobe lamps of an emergency vehicle may effect the ability of the driver to safely operate the vehicle. Under conditions of precipitation, such as rain, fog, or snow, driver visibility may be limited by the vehicle's emergency lights being reflected by the precipitation back into driver's eyes. The high intensity of strobes pose an extra hazard as the reflected light during a short strobe pulse may cause the driver to experience a brief, but repeating, "white out" effect, thus causing the driver to momentarily lose the ability to see through the precipitation. When confronted with such an undesirable condition, a driver may wish to avoid the use of the strobe lamps altogether. However, under such adverse environmental conditions it becomes even more important to alert observers of the presence and intent of the emergency vehicle. There is consequently a need for a vehicle light control system which permits the operator to choose an intermediate intensity level or lower "skip pulse" pattern of lighthead operation as an acceptable operating compromise between the conflicting visual reactions of the driver and those of the third-party observers.

Previous vehicle light control systems are difficult to maintain and to troubleshoot. Heretofore, diagnosis of operational problems of previous light control systems typically involve operating the lightheads while simultaneously observing the exterior of the vehicle on which the lightheads are installed. Unfortunately, from the exterior of the vehicle it is most difficult, if not impossible, to observe the synchronization of all lightheads since all lightheads are not visible from a single vantage point. Consequently, them is a need for a diagnostic and monitoring system for a vehicle light control system.

Installation of previous vehicle light control systems often require the installer to determine and to distinguish the polarity of the various inputs to the vehicle light control system. In the past, if the installer mistakenly reversed the polarity of the connection several systems may have been damaged. The difficulties involved in the diagnosis of vehicle light control system problems explained above have only exasperated this situation. A vehicle light control system having input autopolarity correction is needed to prevent damage during installation.

BRIEF DISCLOSURE OF THE INVENTION

The present invention satisfies the objectives and solves the problems of previous vehicle light control systems with a modular approach. The first module is an operator module which provides an emergency vehicle operator with control over the system while simultaneously enabling the operator to monitor the operation of the entire vehicle light control system. The second module is the central processing module which processes the commands, controls the operation of the attached lightheads, other annunciators, and accessories while generating feedback for operational monitoring purposes. The third module comprises the lightheads, annunciators and attached accessories under the control of the central module.

The present invention permits synchronization of the operation of both the incandescent and strobe lamps either separately or together. The control and synchronization of both the incandescent and strobe lamps by a single controller provides greater flexibility for programming patterns into the light system. For example, the present invention may be programmed to flash the incandescent lamps in a pattern that alternates with strobe pulses. The high intensity light of the strobe lamps would not wash out the light of the incandescent lamps when alternating in this manner. With such an alternating pattern, an observer would visually connect the two light sources together thus enhancing the overall conspicuity of the system.

The present invention also reduces the RFI associated with high voltage transmission through a vehicle's electrical wiring system. The present invention avoids the transmission of high voltages through the entire length of a vehicle's wiring harness by locating strobe light power supplies proximate to each strobe lighthead. Thus, while the central module of the present invention provides triggering signals for the strobe light it does not produce the high voltages which are required to operate the strobe lamps. Rather, the power supply located at the lighthead produces these high voltages to power the strobe lights. In an alternate embodiment, a conventional strobe power supply is separate from the lighthead but still accepts trigger signals from the central module of the present invention. Therefore, by locating the high voltage power supply proximate to the strobe lamp, the present invention eliminates the need for lengthy high voltage lines and avoids the problems inherent with such lines. Additionally, the present invention utilizes optical isolators which are effective in reducing cross-talk or high voltage feedback and RFI.

The present invention increases the effectiveness and conspicuity of an ambulance warning light system by synchronizing all of the incandescent and strobe lamps. In addition, the present invention provides for many other modes of operation which have not been available with previous systems. For example, the present invention provides a third, "skip pulse" mode which operates at lower power levels. Rather than flashing the incandescent lamps only once between two strobe pulses, as is disclosed in the art, this additional mode alternates flashing "A" lights with "B" lights with two incandescent flashes alternating with two strobe pulses.

The present invention permits users to select the types of lights and other annunciating devices, such as horn, sirens and other audio warning systems, that can operate within various patterns. The present invention permits a user to specify the use of incandescent lamps only, strobes only, both incandescent lamps and strobes, or other combinations which may additionally include other annunciating devices. Thereby providing the ability to find a compromise between conflicting goals.

The present invention enables a vehicle to more readily accept a combination of lighthead types. The central module of the present invention permits the use of a wide variety of lightheads, such as incandescent only, strobe only, and combination incandescent and strobe lightheads. For instance, a strobe/incandescent combination lighthead may be located at the front of the vehicle to clear a right of way; strobe lamps may be mounted on the rear of the vehicle for warning of a stopped condition; and incandescent lamps may be located on the sides of the emergency vehicle where higher attention commanding levels are not necessary. Such a system saves energy over a conventional system or a system in which strobe/incandescent lamps are operated on all sides of a vehicle. Additionally, the present invention permits the use of a greater number of patterns which can be programmed to consume lower levels of power and thus lower the power drain on the vehicle's electrical system.

The present invention provides convenient, real-time diagnosis of warning system problems by constantly monitoring each lighthead or other annunciator on the vehicle and then signaling corresponding lights on a graphical representation of the vehicle. The status lights, which may consist of LED's or other visual means, provides a means for monitoring of all of the lighting sequence patterns utilized by the emergency vehicle. Observation of the status light while the vehicle warning system is operating provides an instant indication of the activity of each lighthead or other annunciator relative to the others. Should an annunciator malfunction, its corresponding LED will not light when expected, thus indicating an error condition. Additionally, the activity of an LED of a malfunctioning lighthead will indicate exactly what the lighthead is doing.

The present invention also simplifies installation of a vehicle light control system by providing complete autopolarity correction for existing vehicle sensors and inputs. The present invention avoids requiring an installer to determine the polarity of inputs prior to connecting them to the light system since it is designed to operate regardless of the polarity of the inputs to the system. Consequently, the installation time is greatly decreased and the risk of damaging the system is greatly reduced.

These and other advantages of the present invention will become obvious to one of skill in the art after a review of the following detailed description.

BRIEF DESCRIPTION OF THE DRAWINGS

FIG. 4 depicts a front elevational view of one embodiment of a face panel of the central module of the present invention;

FIG. 5 depicts a plan view of the central module of FIG. 4;

FIGS. 6A–6H depict, in combination, an electrical schematic of one embodiment of the central module and operator module of the present invention;

Figure 1:
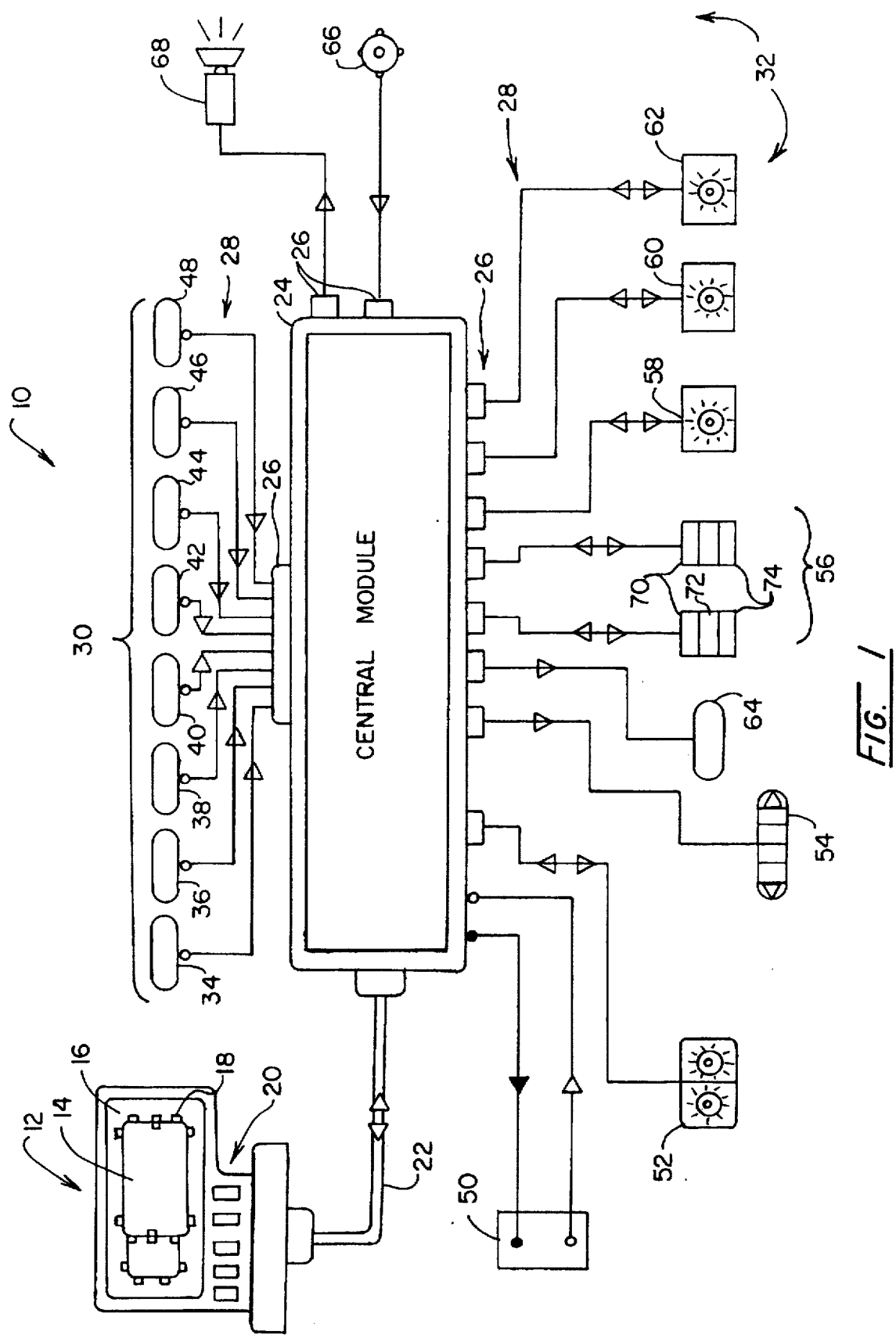
FIG. 1 depicts an overall system lock diagram depicting various modular components of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operated in a similar manner to accomplish a similar purpose. For example, the word "connected" or the phrase "in communication with" or terms similar thereto are often used. Such terms are not limited to direct connection but include connection through other circuit elements where such connection is recognized by one skilled in the art. In addition, circuits are illustrated which are of a type which perform well-known operations on electronic signals. Those skilled in the art will recognize that there are many, and in the future may be additional, alternative circuits which are recognized as equivalent because they provide the same operations on the signals.

DETAILED DESCRIPTION OF THE PRESENT INVENTION

It is to be understood that while the following description describes an ambulance warning light system that the present invention may be utilized anywhere that an annunicator control system, which may include lights and audio devices, may be employed.

Referring to FIG. 1, an overall system block diagram generally showing the modular nature of the present invention is shown at 10. The operator module 12 of the present invention is shown having an overhead vehicle view 14 on its face 16 and lamp monitor LED's located at corresponding locations on the vehicle, as at 18. Additionally, the operator module 12 may be provided with numerous selection switches 20 to permit operator selection between various modes of display operation. The operator module 12 communicates with the central module 24 through cable 22.

The central module 24 communicates through connectors and cables, shown generally as 26 and 28, respectively, with vehicle sensor/switch inputs shown generally at 30 and supported lightheads and accessories, shown generally as 32. Central module 24 includes the processing means (described later) which controls, synchronizes and monitors attached lightheads and accessories 32.

The vehicle sensor/switch inputs 30 shown in FIG. 1 include a reverse switch 34, a brake sensor 36, turn signal switch 38, hazard light switch 40, door open sensor 42, horn switch 44, parking brake sensor 46 and an accessory control input 48. Typically, the vehicle sensor/switch inputs 30 will already be installed on a vehicle and will only require connection to the central module 24 via connectors 26. It is to be appreciated that any number of different types of connectors 26 may be utilized and still remain within the scope of the claimed invention.

A power source 50, such as a 12 Vdc automotive battery, is connected to central module to provide power for operating the present invention.

Supported lightheads and accessory outputs 32 includes a dual lighthead 52, a directional light bar 54, rear tri-cluster lightheads 56, an "A" lighthead 58, a "B" lighthead 60, a "C" lighthead 62, a provisional accessory 64, an ambient light sensor 66 and a horn 68. The rear tri-cluster lightheads 56 is typically configured to include brake/running lamps 70, turn/hazard signal lamps 72 and backup lamps 74.

Figure 2:
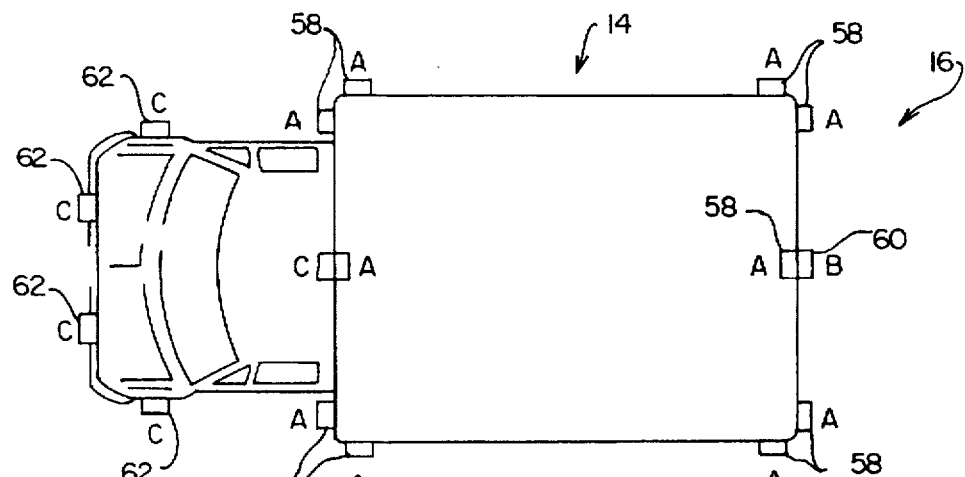
FIG. 2 depicts a graphic representation of one embodiment of an operator diagnostic module of the present invention.

Referring now to FIG. 2, the overhead vehicle diagram 14 of FIG. 1 is shown in greater detail. In this particular embodiment, an overhead view of an ambulance with an arrangement of LEDs corresponding to the placement of annunciators on vehicle 18 is shown. The LED pattern 18 represents the actual placement of lightheads 58, 60, 62 mounted upon the ambulance in which the present invention is installed. Each lighthead has its own corresponding LED in the pattern 18. Operation of the "A" lightheads 58, "B"

lightheads 60, and "C" lightheads are indicated by correspondingly lighted LED's in pattern 18. Thus the LED display 18 provides easy, real-time diagnosis of problems by monitoring, in real-time, each lighthead and providing visual feedback to the operator as to the proper operation of each. The individual LED's are bi-color, such as red-green, to distinguish between strobe and incandescent activation. When an LED flashes green it indicates an incandescent flash at its corresponding lighthead. An LED flashing red it indicates a strobe pulse at its corresponding lighthead. The LED pattern 18 may be observed to monitor the operation of all lightheads in a predetermined sequence. If a certain lighthead is malfunctioning, its corresponding LED will disclose that state to the operator by its failure to light in the predetermined sequence, as expected.

Referring now to FIG. 4, a front panel of the rack mounted central module of the invention is shown at 76. Front panel 76 is provided with an array of fuses 78, a circuit failure diagnostic LED array 80, a system override switch 82, a high/low intensity lamp monitor LED array 84, an input status LED array 86, an input polarity indicating LED array 88 and a control system status LED array 90.

Referring now to FIG. 5, a plan view of the rack mounted central module 92 is shown. Front panel 76 and fuse array 78 are visible in Figure. Central module 92 is provided with a series of circuit boards 94 mounted therein. In addition to other components, the circuit boards 94 are provided with edge connectors 26 to enable the respective circuit board to communicate with system switches, sensors and annunicating devices.

Referring once again to FIG. 4, the rack mounted control panel 76 provides a convenient means to observe and monitor the operation of the present invention through LED arrays 88, 86, 90 and 84. Each LED in array 80 provides an indication of a circuit failure of a corresponding individual subsystem. Fuses 78, associated with corresponding individual subsystems, as well, are provided for easy access. Lastly, system override switch 82 provides the ability to bypass the vehicle's ignition switch and apply power directly to the vehicle warning control system.

The components of the central module 92 and operator module will now be explained. Central module 92 is shown in schematic form across FIGS. 6B-6H. Operator module 12 is shown by schematic representation in FIG. 6A.

Figure 6B:
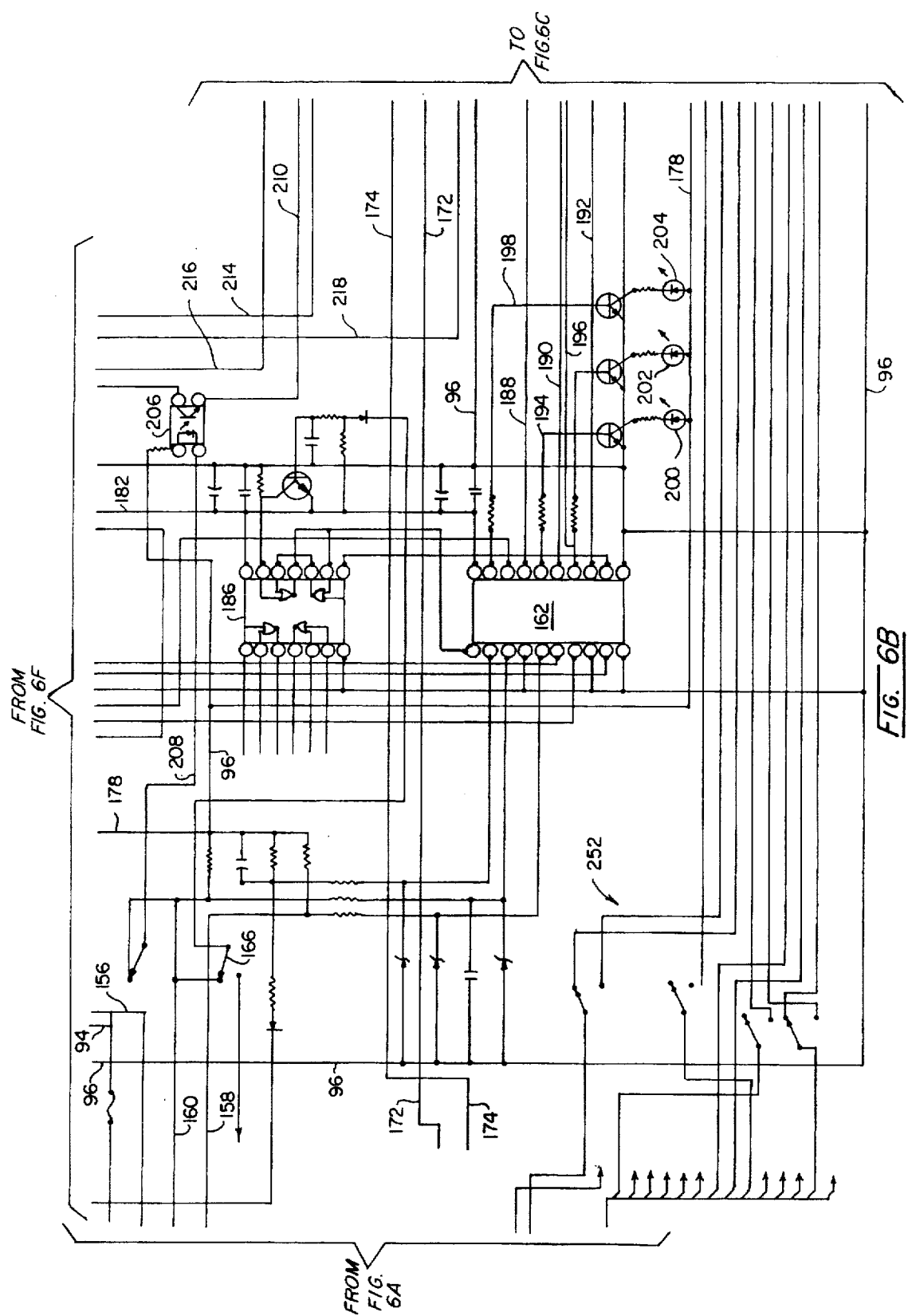
Figure 6D:
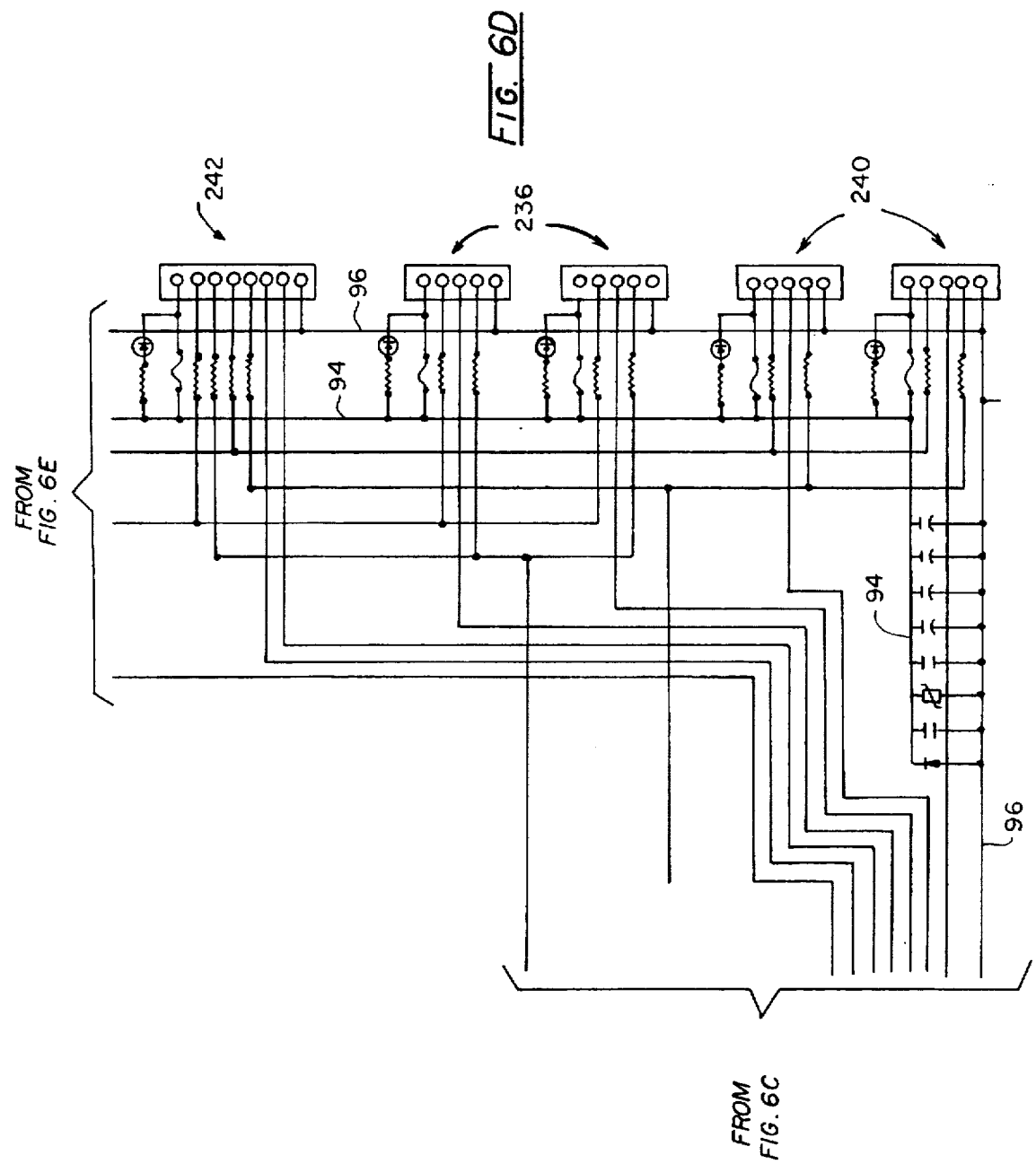
Figure 6F:
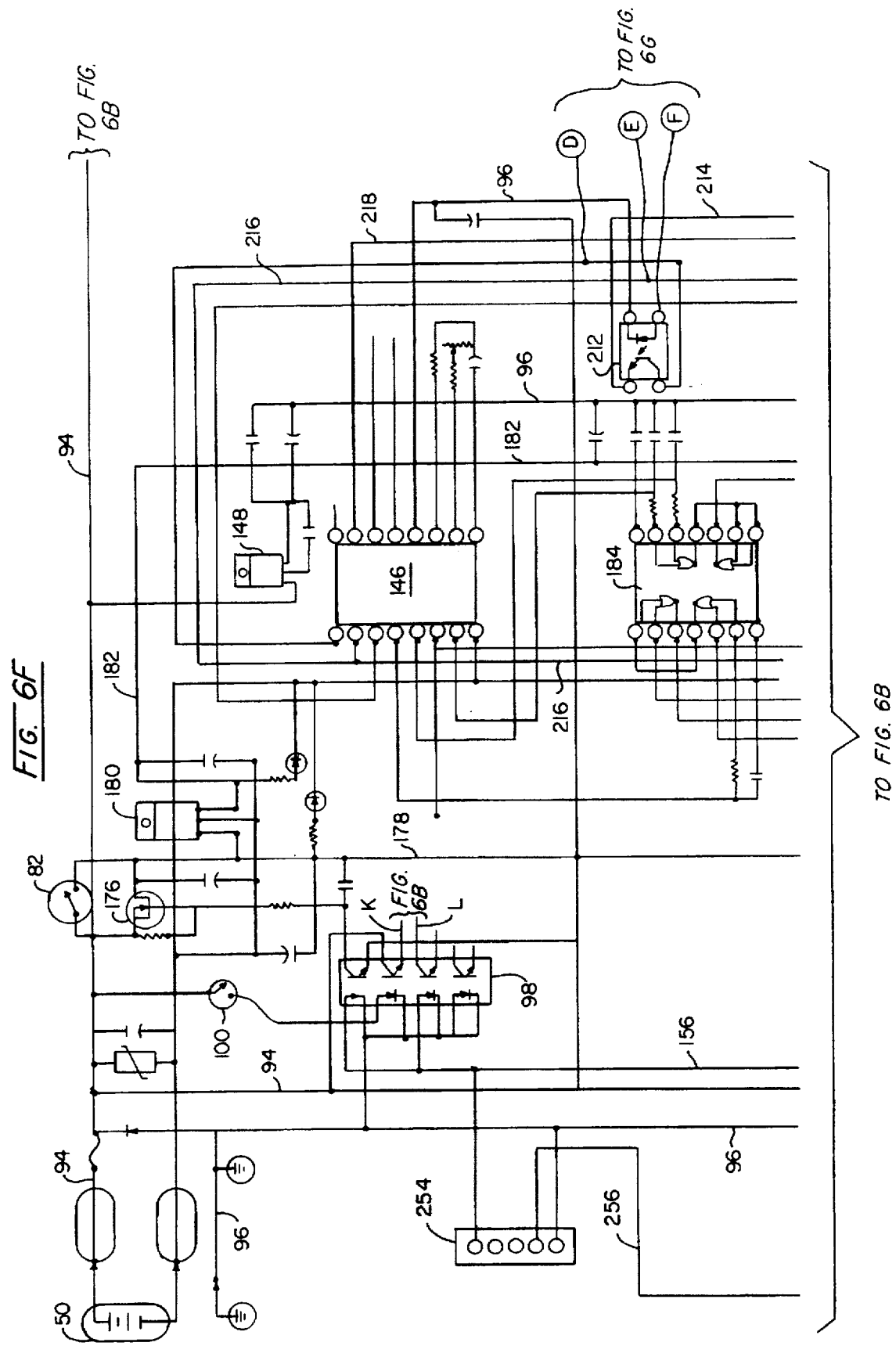

Starting with FIG. 6F, power source 50 provides a 12 Vdc potential on line 94 relative to chassis ground 96. The 12 Vdc line 94 and chassis ground 96 extend throughout FIGS. 6A-6H. Line 94 is connected to ignition switch 100, override switch 82 and primary/secondary mode switch 104 shown in FIG. 6A.

Figures 6F, 6G:
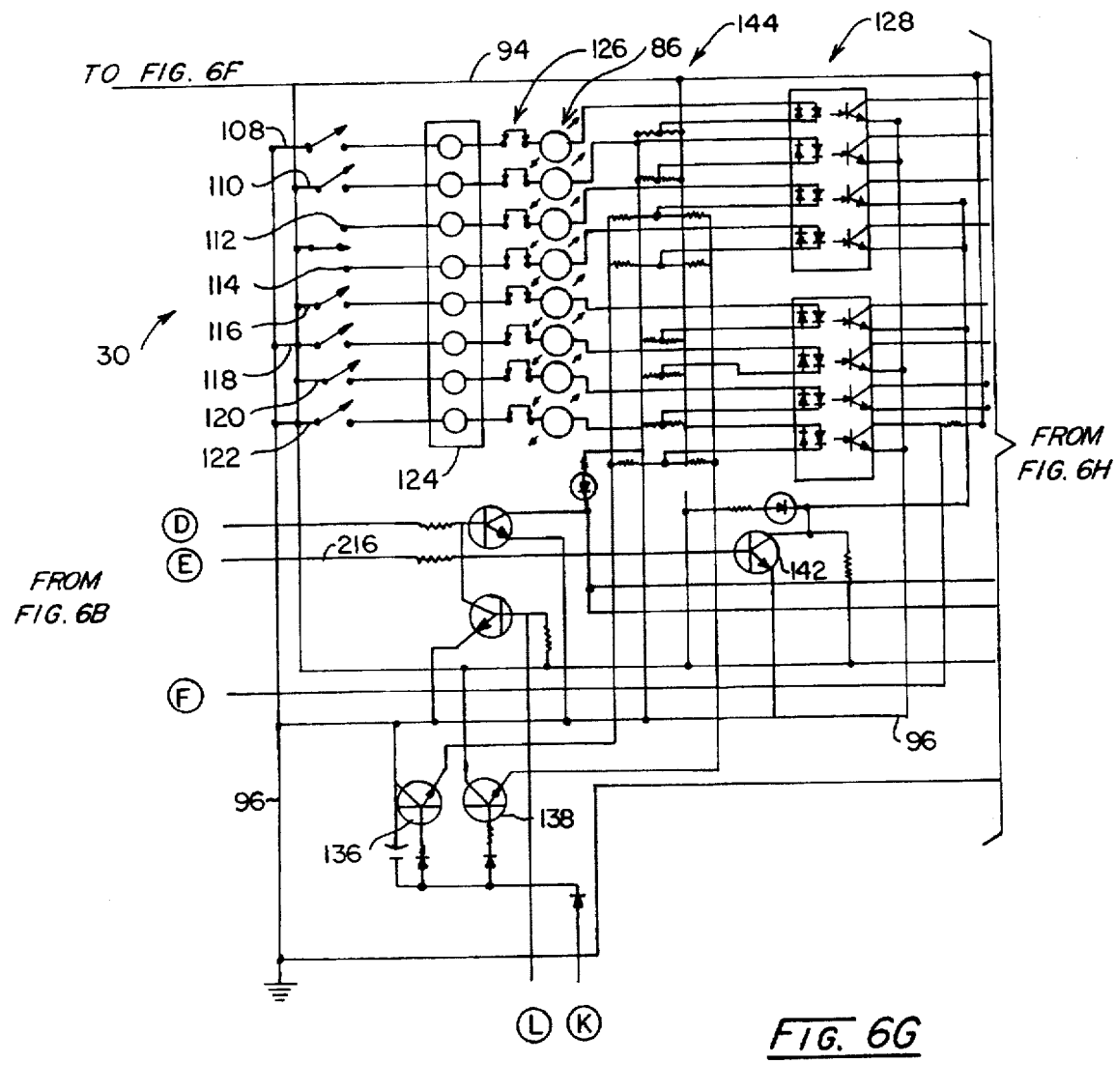
Figure 6H:
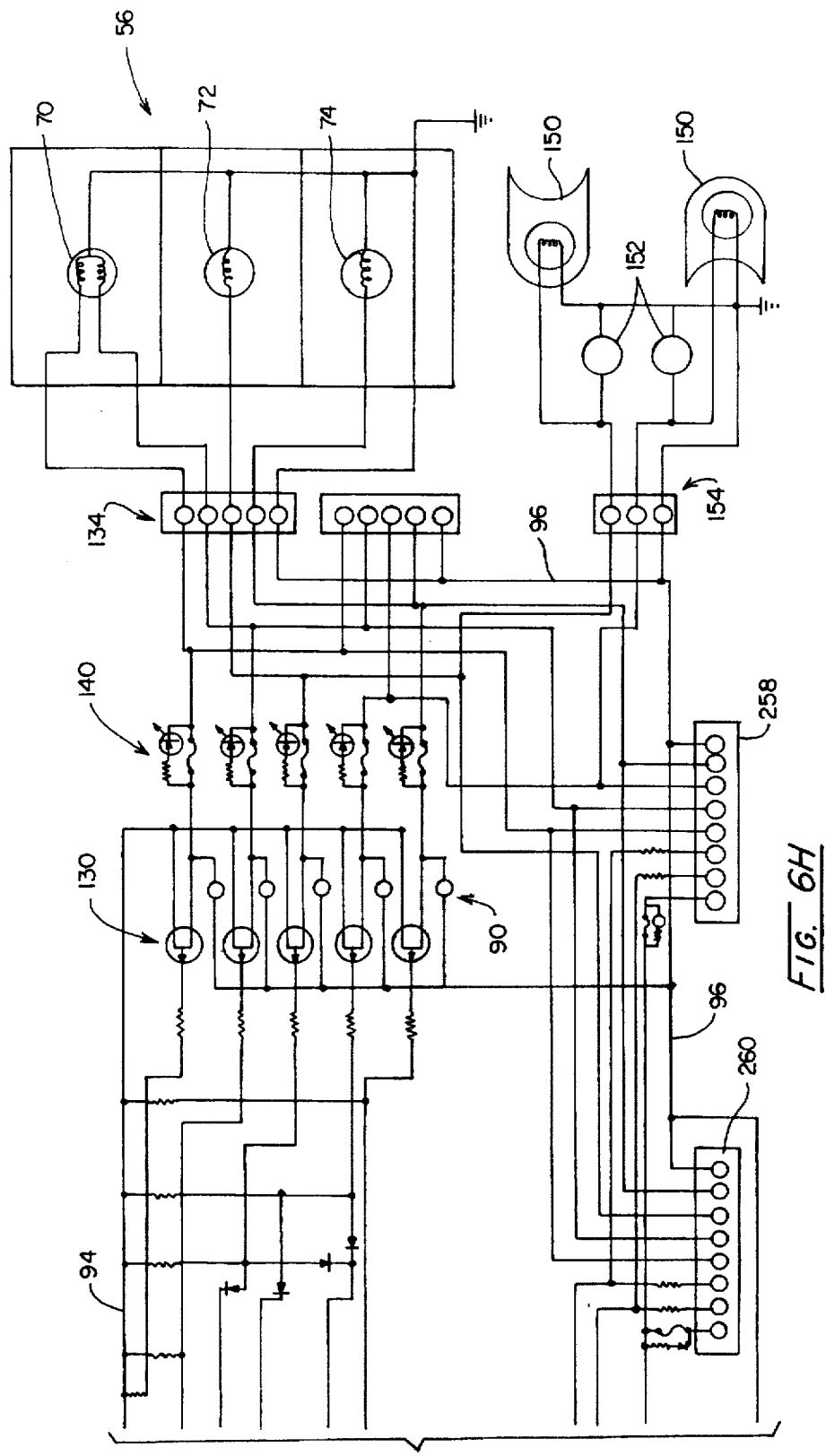
Figure 7:
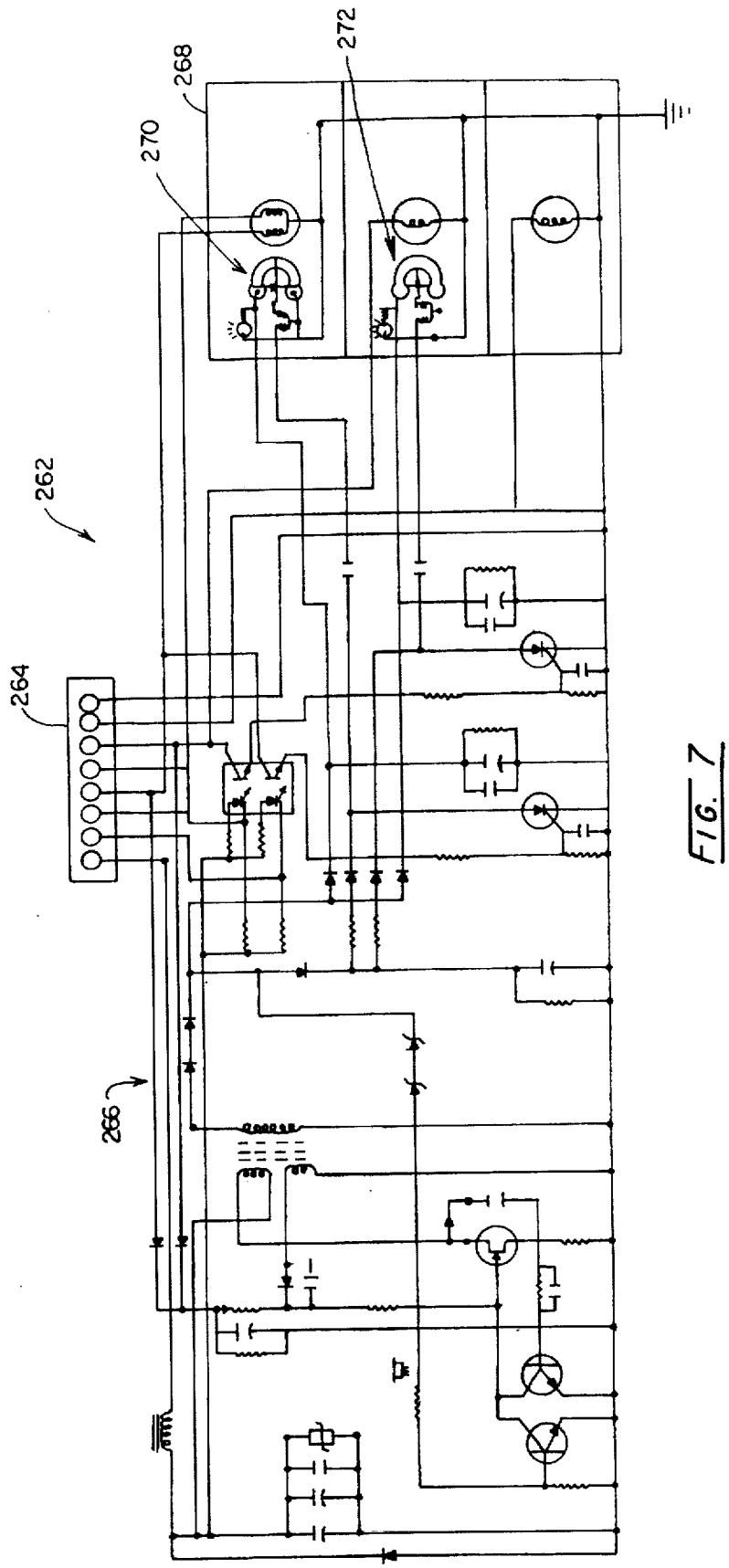
FIG. 7 depicts an electrical schematic of one embodiment of a power supply circuit for an enhanced lighthead of the present invention.

Looking now to FIG. 6G, vehicle sensor/switch inputs are represented generally at 30. Inputs 30 include brake input 108, running light input 110, turn signal inputs 112 and 114, hazard light input 116, reverse input 118, park input 120 and horn input 122. Inputs 30 communicate with the present invention through connector 124. Connector 124 is in communication with jumper array 126. Alternatively, steering diodes (not shown) may be substituted for jumper array 126 to allow for selection of positive or negative polarity only of the inputs 30. Jumper array 126 is in communication with input status LED array 86 which in turn is in communication with optical isolator array 128 through voltage divider networks shown generally at 144. Input status LED array 86 indicates the reception of signals from vehicle sensor inputs 30 and the polarity of those signals. Optical isolator array 128 uses bipolar optical isolators which enable the system to operate when connected to inputs 30 of varying polarity. Optical isolator array 128 is in communication with FET driver array 130 (FIG. 6H) which, in turn is in communication with rear tri-cluster lighthead 56 (only one of which is shown in FIG. 6H) via connector 134. Rear tri-cluster lighthead 56 has incandescent brake/running, turn/hazard and backing lamps, 70, 72 and 74, respectively.

Referring additionally to FIG. 6H, vehicle lights requiring periodic flashing, such as turn signal and hazard lights, use inputs connected through optical isolator array 128 to a flash transistor 142 which is, in turn, in communication with the gates of FET driver array 130. The base of flash transistor 142 is in communication with binary counter/oscillator integrated circuit 146 (FIG. 6F), such as a MC140603CL, for receiving a 1 hertz signal on line 216. Integrated circuit 146 is in communication with 12 Vdc line through 5 volt regulator 148 and is constantly providing a 1 hertz signal on line 216. In response to the 1 hertz signal, flash transistor 142 connects its emitter to ground 96 and FET driver array 130 provides 12 Vdc power to the hazard lights in response. The operation of turn signal lamp operation is similar.

The drains of each of the FETs in FET driver array 130 are in communication with system status LED array 90 which indicate application of 12 Vdc to the corresponding attached lighthead. Additionally, fusee LED array 140 serves to protect the attached lightheads and also indicate a blown fuse.

FET driver array 130 is also in communication with dash turn signal indicators 152 and front turn signal lamps 150 through connector 154. Turn signal indicators 152 and front turn signal lamps 150 are activated together with rear turn signal/hazard lamps 72.

Referring back now to FIG. 6F, ignition switch 100 is in communication with optical isolator array 98 which in turn is in communication with the base of ground transistor 136 and 12 Vdc transistor 138 (FIG. 6G). When ignition switch 100 is closed, ground transistor 136 and 12 Vdc transistor 138 provide a 12 Vdc potential across voltage divider networks 144 which enable operation of left and right turn signals and the vehicle horn (not shown). The present invention is designed to permit the vehicle's brake light, running lights, hazard lights, reverse lights and the parking lights to operate properly while the ignition switch is off. When the ignition switch is turned "on" it provides a potential across transistors 136 and 138 which enables additional operation of the turn signals and the horn. It is to be appreciated that the selective operation of vehicle systems through the ignition switch may be altered and still remain within the scope of the present invention.

Looking now to FIG. 6A, a schematic diagram of the operator module 12 is shown in communication, via lines 94, 156, 158, 160, 172, 174 and 250, with the central module 24, shown in FIGS. 6B-6H. Primary/secondary mode switch 104 is in communication with 12 Vdc line 94 and ground 96. Primary/secondary mode switch 104 is a double pole, double throw switch (dpdt). In a first position, primary/secondary mode switch 104 has no output. In a second position, primary/secondary mode switch 104 provides a switched 12 Vdc signal on line 156 and connects ground 96 to primary signal line 158 to thereby place the vehicle warning control system into a primary operating mode. In a third position, primary/secondary mode switch 104 provides a switched 12 Vdc signal on line 156 and connects ground 96 to secondary signal line 160 to thereby place the vehicle warning system into a secondary operating mode. Primary signal line 158 is in communication with EPROM 162 of FIG. 6B. Secondary signal line 160 is in communication with a "skip pulse" switch 164, FIG. 6B, a dim input select switch 166 and EPROM 162. Primary/secondary mode switch 104 is also in communication with bi-color LED 163. Bi-color LED 163 indicates the mode which the primary/ secondary mode switch 104 has placed the vehicle light control system.

Operator module 12 has an incandescent/strobe lamp select switch 168 in communication with switched 12 Vdc line 156 and ground 96. Lamp select switch 168 is a double pole, double throw switch (dpdt). Lamp select switch 168 is in communication with a bi-color LED 170. In a first position, lamp select switch 168 applies 12 Vdc to LED 170 to enable both colors of LED 170 to activate and to place the system in a combined (strobe and incandescent) mode of operation. In a second position, lamp select switch 168 applies 12 Vdc to LED 170 to enable a first color of LED 170 to activate and provides an incandescent disable signal on line 172 to place the system in a strobe only mode of operation. In a third position, lamp select switch 168 applies 12 Vdc to LED 170 to enable a second color of LED 170 to activate and provides a strobe disable signal on line 174 to place the system into an incandescent only mode of operation.

Operator module 12 is also shown with an overhead vehicle view 14 and lamp monitor LED pattern 18. Lamp monitor LED pattern 18 consists of LEDs which correspond to and visually represent the simultaneous operation of the "A" , "B" and "C" lightheads on the vehicle. Lamp monitor LED pattern 18 communicates with central module through monitor bus 250.

Figure 3:
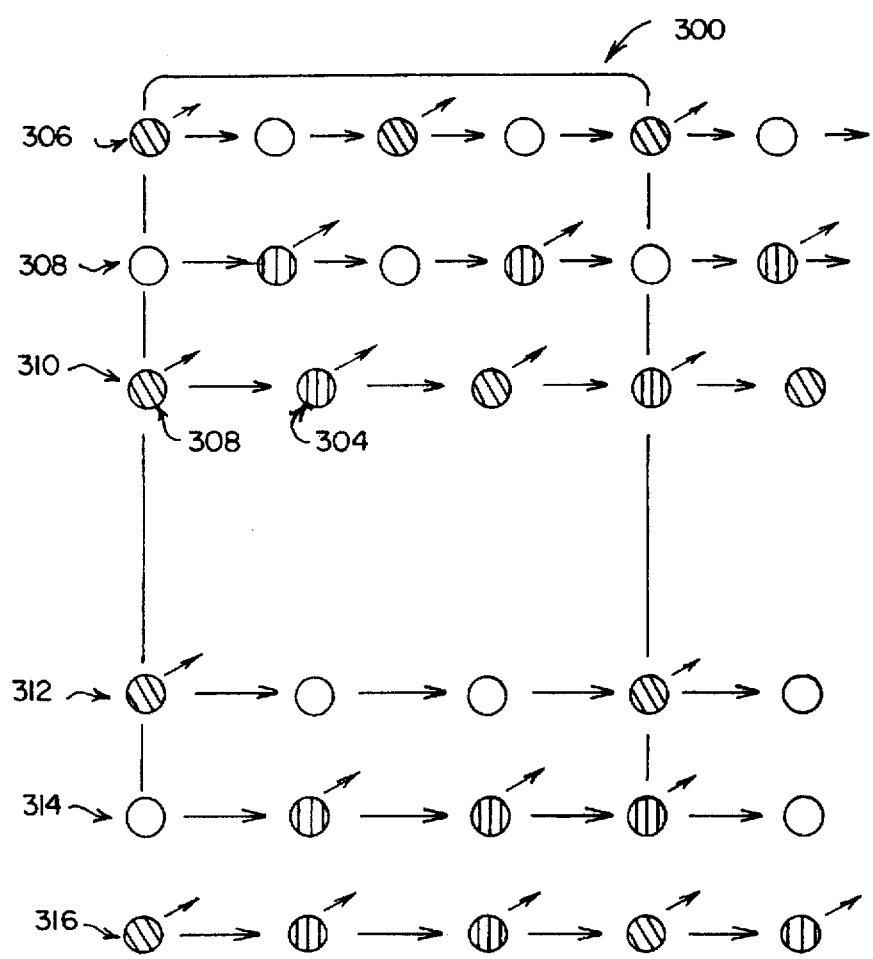
FIG. 3 depicts an annunciator sequencing and diagnostic chart of one embodiment of the present invention.

Referring now to FIG. 6F, optical isolator 98 in the presence of 12 Vdc signal on line 156 provides a signal to the gate of power-up FET 176. The application of the signal to the gate of power-up FET 176 permits the FET 176 to supply 12 Vdc from line 94 to switched power line 178. Switched power line 178 is in communication with 5 volt regulator 180 which supplies power via 5 volt power line 182 to a 2 input Schmitt trigger integrated circuit 184, such as a model MCL14093BCL, quad NOR gate integrated circuit 186, such as a model CD4001, and EPROM 162 (FIG. 6B). Switched power line 178 is also in communication with strobe drive transistors 228 through drive pulse transistors 226 of FIG. 6C. Switched power line 178 is also in communication with incandescent lamp transistors 230 of FIG. 6C. When a 12 Vdc is present on switched power line 178 the strobe and incandescent lamps are enabled. The strobe lamps pulse in response to the received clock signals from clock chip 146 and the incandescent lamps flash in accordance with the programmed sequence as provided by EPROM 162 (FIGS. 3 and 6B). Integrated circuits 184, 186 and 162 cooperate with integrated circuit 146 to produce "A" lamp drive signal 188, "B" lamp drive signal 190, "C" lamp drive signal 192, primary mode signal 194, secondary mode signal 196 and dim mode signal 198. In response to reception of lamp drive signals on lines 188, 190 and 192, incandescent drive transistors 230 switch power to and from the attached incandescent lamps (FIG. 6C).

EPROM 162 (FIG. 6B) is programmed to utilize the clock signals generated by integrated circuit 146 to produce appropriate signals on lines 188, 190 and 192 in response to the mode signals received on lines 158, 160 and from dim input select switch 166 via integrated circuit 186. In a primary mode, EPROM 162 is programmed to provide a signal on "A" lamp drive line 188 of a half second duration in an alternating pattern with half second signals on "B" and "C" lamp drive lines 190 and 192. In a dim mode, EPROM 162 utilizes pulse width modulation to shorten the duty cycle of signals provided on lines 188, 190 and 192, thereby decreasing the brightness of the lamps connected thereto.

In communication with integrated circuit 162 are primary mode indicator LED 200, secondary mode indicator LED 202 and dim mode indicator LED 204. Primary mode indicator LED 200 illuminates in response to primary mode signal 194, secondary mode indicator LED 202 illuminates in response to secondary mode signal 196 and dim mode indicator LED 204 illuminates in response to dim mode signal 198.

"Skip pulse" switch 164 is in communication with optical isolator 206 via skip pulse line 208 which in turn is in communication with integrated circuit 146 from which it receives a ½ hertz signal. In response to a skip pulse signal on skip pulse line 208 optical isolator 206 provides a ½ hertz skip pulse signal on line 210.

Optical isolator 212 (FIG. 6F) is in communication with optical isolator array 128 (FIG. 6G) and with integrated circuit 146 from which it receives a 2 hertz signal. Optical isolator 212 provides a 2 hertz strobe signal on line 214 unless optical isolator 128 receives a signal from horn input 122.

Referring next to FIG. 6C, the bases of "C" strobe disable transistor 220 and of "C" incandescent disable transistor 222 are in communication with secondary mode signal line 196. The bases of strobe energy saving transistors 224 are in communication with 1 hertz signal line 216, ½ hertz signal line 210 and 2 hertz signal line 214. The bases of drive pulse transistors 226 are in communication with the collectors of strobe energy saving transistors 224 and 9 hertz signal line 218. The bases of strobe drive transistors 228 are in communication with "incandescent only" signal line 174, the emitters of drive pulse transistors 226 and the emitter of "C" strobe disable transistor 220. The bases of incandescent drive transistors 230 are in communication with strobe only line 172, "A" lamp drive signal 188, "B" lamp drive signal 190, "C" lamp drive signal 192 and the emitter of "C" incandescent disable transistor 222. Strobe monitor LED array 232 is in communication with strobe drive transistors 228 and incandescent monitor LED array 234 is in communication with incandescent drive transistors 230.

Looking now to FIGS. 6C-6E, connectors which are exemplary of the connectors which are in communication with the lightheads controlled by the present invention are shown. Two "A" lighthead connectors are shown generally at 236, a "B" lighthead connector is shown at 238 and two "C" lighthead connectors are shown generally at 240. Optional combination "B/A" lighthead connector 242, tri-cluster drive connector 244, accessory connector 246 and "C/A" lighthead connector 248 are also shown.

Referring now to FIG. 6B, monitor bus 250 communicates with lighthead select switches, shown generally at 252. Lighthead select switches 252 are utilized to select which lighthead connectors will be monitored by lamp monitor LED pattern 18 via monitor bus 250.

Dim sensor connector 254 (FIG. 6F) is in communication with ground 92 and switched 12 Vdc line 156. Dim sensor connector 254 provides a dim sensor signal on line 256 when generated by a dim sensor (not shown).

Looking now to FIG. 6H, right-side enhanced tri-cluster connector 258 and left enhanced tri-cluster connector 260 are shown. Left and right enhanced tri-cluster connectors 258 and 260 are used to provide communication between the central module of the present invention and enhanced tri-cluster lightheads, one of which is shown generally in FIG.

7 at 262. Connector 264 is in communication with connector 258. Enhanced tri-cluster lighthead 262 includes power supply circuitry 266 for driving strobe lamps 270 and 272 within the bezel 268 of lighthead 262. Brake/running strobe lamp 270 and turn/hazard strobe lamp 272 are both in communication with power supply circuitry 266. Power supply circuitry 266 generates the high voltages required for operation of strobe lamps 270 and 272 locally within the lighthead 262, thus avoiding the transmission of high voltages over any distance within the vehicle in which the present invention is installed. Power supply circuitry 266 also receives trigger signals from central module 24 for triggering strobe pulses.

Figure 8:
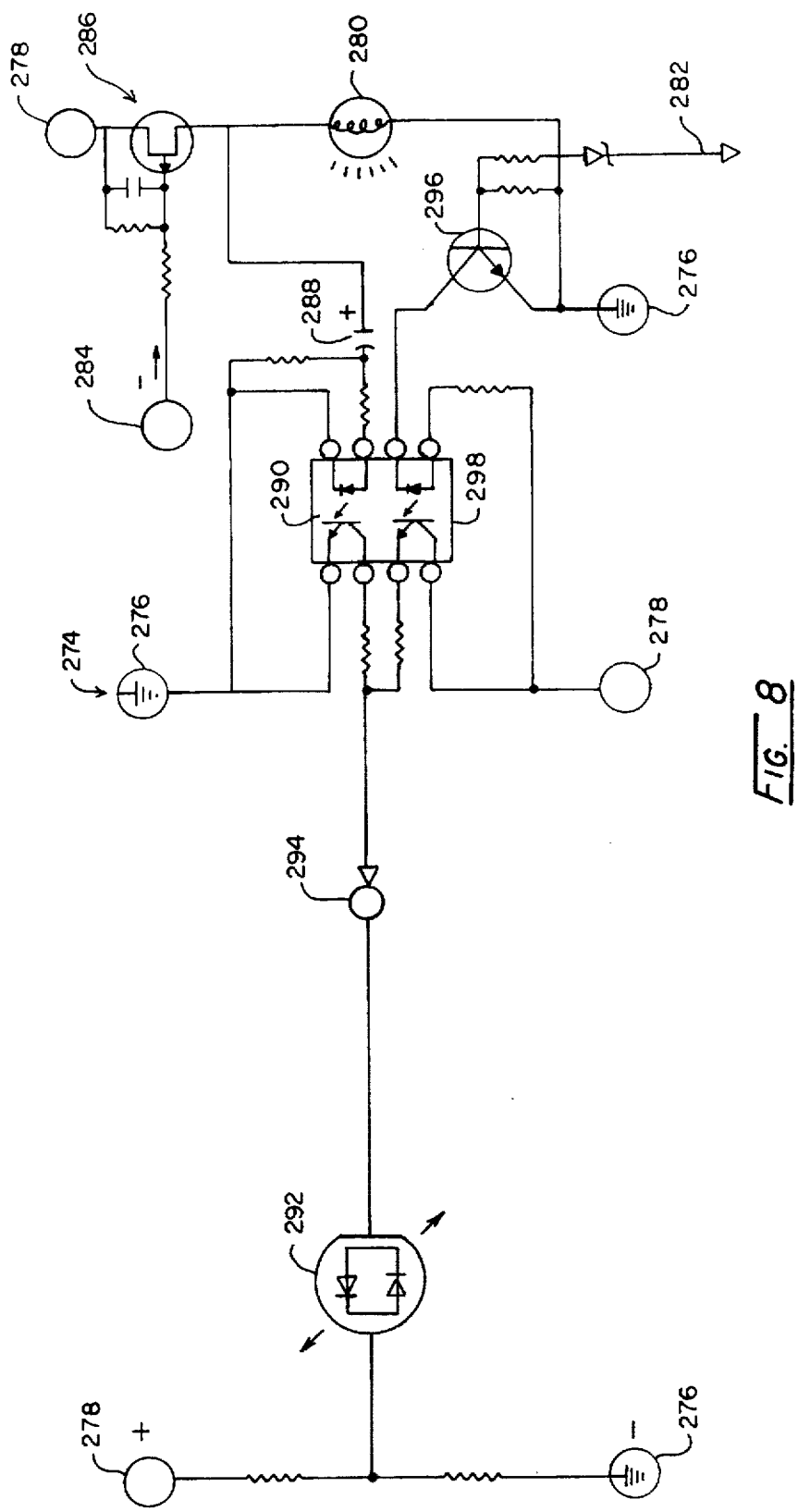
FIG. 8 depicts an electrical schematic of one embodiment of a monitor and feedback circuit of the present invention.

Looking now to FIG. 8, an exemplary monitor circuit 274 of the present invention is shown. Monitor circuit 274 shows the operation of the lamp monitor LED pattern 18 Chassis ground is indicated at 276 and 12 Vdc is indicated at 278. The corresponding incandescent lamp being monitored is shown at 280. The strobe lamp being monitored is not shown, however strobe line 282 is in communication with the strobe lamp being monitored. Incandescent lamp 280 is in communication with incandescent lamp drive line 284 via FET circuit 286 and capacitor 288. Capacitor 288, in turn, is in communication with chassis ground 276 and optical isolator 290. Optical isolator 290 is in communication with bi-color LED 292 via connector 294. Strobe line 282 is in communication with the base of transistor 296. The collector of transistor 296 is in communication with optical isolator 298. Optical isolator 298 is in communication with 12 Vdc line 278 and chassis ground 276 via bi-color LED 292 and connector 294.

When FET circuit 286 receives an incandescent lamp drive signal on line 284 it supplies 12 Vdc to both the incandescent lamp 280 and capacitor 288. As capacitor 288 charges, optical isolator 290 closes the circuit between 12 Vdc 278 through LED 292 and connector 294 to chassis ground 276. This arrangement causes a first color of LED 292 to illuminate. When incandescent lamp drive signal ceases on line 284, FET circuit 286 ceases the application of 12 Vdc to incandescent lamp 280 and capacitor 288. Capacitor 288 then discharges through incandescent lamp 280 and causes optical isolator 290 to open the circuit connection between LED 292 and chassis ground 276. If the filament of incandescent lamp 280 were broken, capacitor 288 could not discharge and the first color of LED 292 ceases to illuminate.

When a strobe signal is present on strobe line 282, transistor 296 closes the circuit between 12 Vdc 278 and chassis ground 276 through optical isolator 298. In response, optical isolator 298 closes the circuit between 12 Vdc 278 and ground 276 through bi-color LED 292. Bi-color LED 292 then illuminates a second color. When a strobe signal is no longer present on strobe line 282, the second color of bi-color LED 292 ceases to illuminate.

Bi-color LED 292 is exemplary of one of the bi-color LEDs in lamp monitor LED pattern 18 in operator module 12 as shown in FIG. 6A. By viewing the illumination pattern of lamp monitor LED pattern 18 the operating patterns of the lightheads controlled by the present invention may be observed. Additionally, irregularities in the sequence of illumination permits system diagnosis by indicating potential annunciator component problems.

Referring now to FIG. 3, a timing and diagnostic chart for a single LED of the LED pattern 18 is shown. A bracket 300 provides a reference for the elapse of one second of time. The bi-color LEDs of LED pattern 18 are capable of generating a green color which is indicated by circles with slanting hash lines as at 308 and a red color which is indicated by circles with vertical hash lines as at 304. Blank circles indicate that the LED is not generating light. The present invention is capable of producing the time elapsed images shown at 306, 308, and 310 in a Primary/Full Output Mode and the images shown at 312, 314 and 316 in a Secondary/Dim Mode. Line 306 shows Primary/Full Output/Incandescent Only Mode images. The LED in line 306 flashes green twice a second. Line 308 shows Primary/Full Output/Strobe Only Mode images. The LED in line 308 flashes red twice a second to indicate corresponding strobe pulses. The images of line 306 and line 308 are synchronized but out-of-phase with one another. Line 310 shows Primary/Full Output/Combined Mode images. The LED in line 310 flashes alternating green 308 and red 304 colors. The images of line 310 are not synchronized with the timing of lines 306 or 308 because of the different dwell periods of the corresponding control networks. Line 312 shows Secondary/Dim Output/Incandescent Only Mode images. The LED in line 312 flashes green once a second. Line 314 shows Secondary/Dim Output/Strobe Only Mode images. The LED in line 314 flashes red three times a second. Line 316 shows Secondary/Dim Output/Combined Mode images. The LED in line 316 flashes green once a second and has two red flashes in-between each green flash. The images of lines 312, 314 and 316 are all synchronized in their timing.

Although this invention has been shown and described with respect to detailed embodiments thereof, it will be understood by those skilled in the art that various changes in form and detail thereof may be made without departing from the scope of the claimed invention.

We claim:

1. A vehicle warning system controller, wherein said vehicle includes a power source and multiple arrangements of annunciator installed generally about the periphery of said vehicle, said controller comprising:

an operator module having a mode selection switch in communication with said power source, wherein said mode selection switch is actuable to derive a primary and secondary mode condition;

a central control module, comprising a processor in communication with said operator module, wherein said processor is responsive in the presence of said primary mode condition for deriving a predetermined first pattern of annunciator signals, and wherein said processor is responsive in the presence of said secondary mode condition for deriving a predetermined second pattern of annunciator signals; and an annunciator driver in communication with said processor, wherein said annunciator driver is responsive in the presence of said predetermined first pattern of annunciator signals for activating said multiple arrangements of annunciator in accordance with a first predetermined flashing pattern, and wherein said annunciator driver is responsive in the presence of said predetermined second pattern of annunciator signals for activating said multiple arrangements of annunciator in accordance with a second predetermined flashing pattern.

wherein each annuniciator is comprised of a stroboscopic and incandescent lamp pair.

2. The vehicle warning system controller of claim 1, further comprising an LED patterned display in communication with said multiple arrangements of annunciator, wherein each LED of said LED patterned display is bi-colored and is in communication with each lamp in said lamp pair, and wherein each LED is responsive to the activation of the incandescent lamp in a corresponding annunciator for generating a first color output, and wherein each LED is further responsive to the activation of the strobe lamp in said corresponding annunciator for generating a second color output for indicating the activation of each of said lamps.

3. The vehicle warning system controller of claim 2, wherein said operator module further comprises a vehicle diagram, wherein each said LED of said LED patterned display is positioned on said vehicle diagram to correspond with the position of each of said corresponding annunciators on said vehicle.

4. The vehicle warning system controller of claim 1, further comprising:
   a first mode indicator LED in communication with said mode selection switch, wherein said first mode indicator is responsive in the presence of said primary mode condition to generate a visually perceptable signal; and
   a second mode indicator LED in communication with said mode selection switch, wherein said second mode indicator is responsive in the presence of said secondary mode condition to generate a visually perceptable signal.

5. The vehicle warning system controller of claim 1, wherein said multiple arrangements of annunciators comprise:
   a first arrangement of lightheads installed about said vehicle;
   a second arrangement of lightheads installed about said vehicle; and
   a third arrangement of lightheads installed about said vehicle, wherein said first predetermined flashing pattern comprises said third arrangement of lightheads activating in an alternating pattern with said first and second arrangement of lightheads, and wherein said second predetermined pattern comprises said first arrangement of lightheads activating in an alternating pattern with said second arrangement of lightheads,
wherein each of said lightheads is comprised of a stroboscopic and incandescent lamp pair.

6. The vehicle warning system controller of claim 5, further comprising:
   a first annunciator arrangement indicator LED in communication with said annunciator driver, wherein said first annunciator arrangement indicator LED is responsive in the presence of the activation of said first arrangement of lightheads to generate a visually perceptible signal;
   a second annunciator arrangement indicator LED in communication with said annunciator driver, wherein said second annunciator arrangement indicator LED is responsive in the presence of the activation of said second arrangement of lightheads to generate a visually perceptible signal; and
   a third annunciator arrangement indicator LED in communication with said annunciator driver, wherein said third annunciator arrangement indicator LED is responsive in the presence of the activation of said third arrangement of lightheads to generate a visually perceptible signal.

7. The vehicle warning system controller of claim 1, further comprising an ambient light sensor in communication with said processor, wherein said ambient light sensor derives a dim condition signal, wherein said processor is responsive in the presence of said primary mode condition and said dim condition signal for deriving a predetermined third pattern of lighthead signals, wherein said processor is responsive in the presence of said secondary mode condition and said dim condition signal for deriving a predetermined fourth pattern of lighthead signals, wherein said annunciator driver is responsive in the presence of said predetermined third pattern of lighthead signals for activating said arrangements of annunciators in accordance with a third predetermined flashing pattern, and wherein said annunciator driver is responsive in the presence of said predetermined fourth pattern of lighthead signals for activating said arrangements of annunciators in accordance with a fourth predetermined flashing pattern.

8. The vehicle warning system controller of claim 7, further comprising a dim mode indicator LED in communication with said processor, wherein said dim mode indicator LED is responsive in the presence of said dim condition signal for generating a visually perceptable signal.

9. The vehicle warning system controller of claim 7, further comprising:
   a second mode selection switch, wherein said second mode selection switch is actuable in a first position to derive a strobe disable signal, wherein said mode selection switch is actuable in a second position to derive an incandescent lamp disable signal, wherein said second mode selection switch is actuable in a third position;
   wherein said annunciator driver comprises:
      a strobe lamp driver in communication with said processor and said second mode selection switch, wherein said strobe lamp driver is responsive in the presence of said predetermined first pattern of annunciator signals for activating said strobe lamps in said arrangements of annunciators in accordance with said first predetermined pattern, wherein said strobe lamp driver is responsive in the presence of said predetermined second pattern of annunciator signals for activating said strobe lamps in said arrangements of annunciators in accordance with said second predetermined flashing pattern, and wherein said strobe driver is responsive in the presence of said strobe disable signal for preventing the activation of said strobe lamps; and
      an incandescent lamp driver in communication with said processor and said second mode selection switch, wherein said incandescent lamp driver is responsive in the presence of said predetermined first pattern of annunciator signals for activating said incandescent lamps in said arrangements of annunciators in accordance with said first predetermined flashing pattern, wherein said incandescent lamp driver is responsive in the presence of said predetermined second pattern of annunciator signals for activating said incandescent lamps in said arrangements of annunciators in accordance with said second predetermined flashing pattern, and wherein said incandescent lamp driver is responsive in the presence of said incandescent lamp disable signal for preventing the activation of said incandescent lamps.

10. The vehicle warning system controller of claim 9, further comprising a lamp selection bi-color LED in communication with said second mode selection switch, wherein said lamp selection bi-color LED is responsive to said first position of said second mode selection switch for generating a first color, wherein said lamp selection bi-color LED is responsive to said second position of said second mode selection switch for generating a second color, and wherein said lamp selection bi-color LED is responsive to said third position of said second mode selection switch for generating said first and second colors.

11. A vehicle warning system controller, wherein said vehicle includes a power source, multiple arrangements of annunciators mounted generally about the periphery of said vehicle, a series of vehicle system inputs for monitoring vehicle electrical system components and a series of vehicle system outputs for controlling said vehicle system components, said controller comprising:

an operator module having a mode selection switch in communication with said power source, wherein said mode selection switch is actuable to derive a primary secondary mode condition;

a central control module, comprising:
 a processor in communication with said operator module, wherein said processor is responsive in the presence of said primary mode condition for deriving a predetermined first pattern of annunciator signals, wherein said processor is responsive in the presence of said secondary mode condition for deriving a predetermined second pattern of annunciator signals;
 an annunciator driver in communication with said processor, wherein said annunciator driver is responsive in the presence of said predetermined first pattern of annunciator signals for activating said arrangements of annunciator in accordance with a first predetermined flashing pattern, and wherein said annunciator driver is responsive in the presence of said predetermined second pattern of annunciator signals for activating said arrangements of annunciator in accordance with a second predetermined flashing pattern; and
 a vehicle system driver in communication with said processor and said vehicle system inputs, wherein said vehicle system driver is responsive in the presence of said vehicle system inputs and outputs for operating said corresponding vehicle system components, wherein each annunciator is comprised of a stroboscopic and incandescent lamp pair.

12. The vehicle warning system controller of claim 11, further comprising a steering diode array in communication with said vehicle system inputs.

13. A vehicle warning system controller for controlling an array of annunciator mounted upon an ambulance, said ambulance having a reverse sensor actuable to derive a reverse condition signal, a backup light, a brake sensor actuable to derive a brake condition signal, a brake light, a left turn switch actuable to derive a left turn signal, a left turn light, a right turn switch actuable to derive a right turn signal, a right turn light, a hazard switch actuable to derive a hazard signal, a door switch actuable to derive a door open condition signal, a door light, a parking brake sensor actuable to derive a parking brake condition signal, a parking brake light, a horn switch actuable to derive a horn signal, a horn, and a power source which generates a voltage potential with respect to the chassis of said ambulance, wherein said array of annunciator comprise a set of "A" lightheads, a set of "B" lightheads and a set of "C" lightheads, wherein each of said lightheads include incandescent lamps and strobe lamps, said control system comprising:

an operator module, comprising
 a first mode selection switch in communication with said power source and said ground, wherein said first mode selection switch is actuable to derive a primary mode condition and a secondary mode condition;
 a first bi-color LED in communication with said first mode selection switch, said first bi-color LED responsive in the presence of said primary mode condition for generating a first color, and responsive in the presence of said secondary mode condition for generating a second color;
 a second mode selection switch in communication with said power source and said ground, wherein said second mode selection switch is actuable to derive a strobe driver disable signal and an incandescent driver disable signal;
 a second bi-color LED in communication with said second mode selection switch, wherein said second bi-color LED is responsive in the presence of said strobe only mode condition for generating a first color, responsive in the presence of said incandescent only mode condition for generating a second color and responsive in the presence of said combination mode condition for generating first and second colors;
 an array of "A" lighthead bi-color monitor LEDs in communication with said array of "A" lightheads, wherein said array of "A" lighthead bi-color monitor LEDs are arranged diagrammatically to represent each "A" lighthead position on said vehicle, wherein each said "A" lighthead bi-color monitor LED generates a first color in response to activation of its corresponding strobe lamp and a second color in response to activation of its corresponding incandescent lamp;
 an array of "B" lighthead bi-color monitor LEDs in communication with said array of "B" lightheads, wherein said array of "B" lighthead bi-color monitor LEDs are arranged diagrammatically to represent each "B" lighthead position on said vehicle, wherein each said "B" lighthead bi-color monitor LED generates a first color in response to activation of its corresponding strobe lamp and a second color in response to activation of its corresponding incandescent lamp;
 an array of "C" lighthead bi-color monitor LEDs in communication with said array of "C" lightheads, wherein said array of "C" lighthead bi-color monitor LEDs are arranged diagrammatically to represent each "C" lighthead position on said vehicle, wherein each said "C" lighthead bi-color monitor LED generates a first color in response to activation of its corresponding strobe lamp and a second color in response to activation of its corresponding incandescent lamp;
 an ambient light sensor responsive to diminished ambient light to derive a dim mode control signal condition;

a central module, comprising
 a processor in communication with said operator module, wherein said processor is responsive in the presence of said primary mode condition for deriving a primary indicator signal and a predetermined primary pattern of "A" lighthead signals, "B" lighthead signals and "C" lighthead signals, wherein said processor is responsive in the presence of said secondary mode condition for deriving a secondary indicator signal and a predetermined secondary pattern of "A" lighthead signals and "B" lighthead signals, wherein said processor is responsive in the presence of said dim mode control signal condition and said primary mode condition for deriving a dim indicator signal and a predetermined primary dim pattern of "A" lighthead signals, "B" lighthead signals and "C" lighthead signals, wherein said processor is responsive in the presence of said dim mode condition and said secondary mode condition for deriving a dim indicator signal and a predetermined secondary dim pattern of "A" lighthead signals and "B" lighthead signals;

a primary mode indicator LED in communication with said processor, wherein said primary mode indicator LED is responsive in the presence of said primary indicator signal for effecting a visually perceptable signal;

a secondary mode indicator LED in communication with said processor, wherein said secondary mode indicator LED is responsive in the presence of said secondary indicator signal for effecting a visually perceptable signal;

a dim mode indicator LED in communication with said processor, wherein said dim mode indicator LED is responsive in the presence of said dim indicator signal for effecting a visually perceptable signal;

a reverse sensor monitor LED in communication with said reverse sensor, wherein said reverse sensor monitor LED is responsive in the presence of said reverse condition signal for producing a first color indicative of a first polarity of said reverse condition signal and for producing a second color indicative of a second polarity of said reverse condition signal;

a brake sensor monitor LED in communication with said brake sensor, wherein said brake sensor monitor LED is responsive in the presence of said brake condition signal for producing a first color indicative of a first polarity of said brake condition signal and for producing a second color indicative of a second polarity of said brake condition signal;

a left turn monitor LED in communication with said left turn switch, wherein said left turn monitor LED is responsive in the presence of said left turn signal for producing a first color indicative of a first polarity of said left turn signal and for producing a second color indicative of a second polarity of said left turn signal;

a right turn monitor LED in communication with said right turn switch, wherein said right turn monitor LED is responsive in the presence of said right turn signal for producing a first color indicative of a first polarity of said right turn signal and for producing a second color indicative of a second polarity of said right turn signal;

a hazard switch monitor LED in communication with said hazard switch, wherein said hazard switch monitor LED is responsive in the presence of said hazard signal for producing a first color indicative of a first polarity of said hazard signal and for producing a second color indicative of a second polarity of said hazard signal;

a door switch monitor LED in communication with said door switch, wherein said door switch monitor LED is responsive in the presence of said door open condition signal for producing a first color indicative of a first polarity of said door open condition signal and for producing a second color indicative of a second polarity of said door open condition signal;

a parking brake sensor monitor LED in communication with said parking brake sensor, wherein said parking brake sensor monitor LED is responsive in the presence of said parking brake condition signal for producing a first color indicative of a first polarity of said parking brake condition signal and for producing a second color indicative of a second polarity of said parking brake condition signal;

a horn switch monitor LED in communication with said horn switch, wherein said horn switch monitor LED is responsive in the presence of said horn signal for producing a first color indicative of a first polarity of said horn signal and for producing a second color indicative of a second polarity of said horn signal;

a reverse sensor optical isolator in communication with said reverse sensor, wherein said reverse sensor optical isolator is responsive in the presence of said reverse condition signal for effecting a visually perceptable signal;

a reverse light driver in communication with said reverse sensor optical isolator, wherein said reverse light driver is responsive in the presence of said reverse light signal to activate said backup light;

a reverse light monitor LED in communication with said reverse light driver, wherein said reverse light monitor LED is responsive in the presence of said reverse light signal for effecting a visually perceptable signal;

a brake sensor optical isolator in communication with said brake sensor, wherein said brake sensor optical isolator is responsive in the presence of said brake condition signal for generating a brake light signal;

a brake light driver in communication with said brake sensor optical isolator, wherein said brake light driver is responsive in the presence of said brake light signal to activate said brake light;

a brake light monitor LED in communication with said brake light driver, wherein said brake light monitor LED is responsive in the presence of said brake light signal to generate light;

a left turn optical isolator in communication with said left turn switch, wherein said left turn optical isolator is responsive in the presence said left turn signal to generate a left turn light signal;

a left turn light driver in communication with said left turn optical isolator, wherein said left turn light driver is responsive in the presence of said left turn light signal to activate said left turn light;

a left turn light monitor LED in communication with said left turn light driver, wherein said left turn light monitor LED is responsive in the presence of said left turn light signal for effecting a visually perceptable signal;

a right turn optical isolator in communication with said right turn switch, wherein said right turn optical isolator is responsive in the presence said right turn signal to generate a right turn light signal;

a right turn light driver in communication with said right turn optical isolator, wherein said right turn light driver is responsive in the presence of said right turn light signal to activate said right turn light;

a right turn light monitor LED in communication with said right turn light driver, wherein said right turn light monitor LED is responsive in the presence of said right turn light signal for effecting a visually perceptable signal;

a hazard switch optical isolator in communication with said hazard switch, wherein said hazard switch optical isolator is responsive in the presence of said hazard signal for generating left and right turn light signals;

a door switch optical isolator in communication with said door switch, wherein said door switch optical isolator is responsive in the presence of said door open condition signal for generating a door light signal;

a door light driver in communication with said door switch optical isolator, wherein said door light driver is responsive in the presence of said door light signal to activate said door light;

a door light monitor LED in communication with said door light driver, wherein said door light monitor LED is responsive in the presence of said door light signal for effecting a visually perceptable signal;

a parking brake sensor optical isolator in communication with said parking brake sensor, wherein said parking brake sensor optical isolator is responsive in the presence of said parking brake condition signal to generate a parking brake light signal;

a parking brake light driver in communication with said parking brake sensor optical isolator, wherein said parking brake light driver is responsive in the presence of said parking brake light signal to activate said parking brake light;

a parking brake light monitor LED in communication with said parking brake light driver, wherein said parking brake light monitor LED is responsive in the presence of said parking brake light signal for effecting a visually perceptable signal;

a horn switch optical isolator in communication with said horn switch, wherein said horn switch optical isolator is responsive in the presence of said horn signal to generate a horn activation signal;

a horn driver in communication with said horn switch optical isolator, wherein said horn driver is responsive in the presence of said horn activation signal to activate said horn;

a horn monitor LED in communication with said horn driver, wherein said horn monitor LED is responsive in the presence of said horn activation signal for;

an "A" strobe driver in communication with said processor and said second mode selection switch, wherein said "A" strobe driver is responsive in the presence of said "A" lighthead signal to activate said strobe lamps of said "A" lightheads, wherein said "A" strobe driver is responsive in the presence of said strobe driver disable signal for preventing the activation of said strobe lamps of said "A" lightheads;

a "B" strobe driver in communication with said processor and said second mode selection switch, wherein said "B" strobe driver is responsive in the presence of said "B" lighthead signal to activate said strobe lamps of said "B" lightheads, wherein said "B" strobe driver is responsive in the presence of said strobe driver disable signal for preventing the activation of said strobe lamps of said "B" lightheads;

a "C" strobe driver in communication with said processor and said second mode selection switch, wherein said "C" strobe driver is responsive in the presence of said "C" lighthead signal to activate said strobe lamps of said "C" lightheads, wherein said "C" strobe driver is responsive in the presence of said strobe driver disable signal for preventing the activation of said strobe lamps of said "C" lightheads;

an "A" incandescent driver in communication with said processor and said second mode selection switch, wherein said "A" incandescent driver is responsive in the presence of said "A" lighthead signal to activate said incandescent lamps of said "A" lightheads, wherein said "A" incandescent driver is responsive in the presence of said incandescent driver disable signal for preventing the activation of said incandescent lamps of said "A" lightheads;

a "B" incandescent driver in communication with said processor and said second mode selection switch, wherein said "B" incandescent driver is responsive in the presence of said "B" lighthead signal to activate said incandescent lamps of said "B" lightheads, wherein said "B" incandescent driver is responsive in the presence of said incandescent driver disable signal for preventing the activation of said incandescent lamps of said "B" lightheads;

a "C" incandescent driver in communication with said processor and said second mode selection switch, wherein said "C" incandescent driver is responsive in the presence of said "C" lighthead signal to activate said incandescent lamps of said "C" lightheads, wherein said "C" incandescent driver is responsive in the presence of said incandescent driver disable signal for preventing the activation of said incandescent lamps of said "C" lightheads.

* * * * *